United States Patent [19]

Oka

[11] Patent Number: 4,752,528

[45] Date of Patent: Jun. 21, 1988

[54] MODIFIED FINE PARTICLES AND A PROCESS FOR THEIR PRODUCTION

[75] Inventor: Koichiro Oka, Ibaraki, Japan

[73] Assignee: Toray Industries, Inc., Tokyo, Japan

[21] Appl. No.: 818,426

[22] Filed: Jan. 13, 1986

Related U.S. Application Data

[63] Continuation-in-part of Ser. No. 651,362, May 13, 1986, Pat. No. 4,588,617.

[30] Foreign Application Priority Data

Jan. 17, 1985 [JP] Japan .................................. 60-6608

[51] Int. Cl.$^4$ ................................................ B32B 5/14
[52] U.S. Cl. ...................................... 428/403; 428/407
[58] Field of Search ...................... 427/443.1; 428/407, 428/409, 403; 523/420

[56] References Cited

U.S. PATENT DOCUMENTS

| | | | |
|---|---|---|---|
| 4,446,257 | 5/1984 | Kooijmans et al. | 523/420 |
| 4,517,246 | 5/1985 | Matsuyama et al. | 428/403 X |
| 4,588,617 | 5/1986 | Oka | 427/443.1 |

*Primary Examiner*—Thomas J. Herbert
*Attorney, Agent, or Firm*—Armstrong, Nikaido, Marmelstein & Kubovcik

[57] ABSTRACT

Organic spherical particles having a cationic group and an average particle size of 0.1–1000 μm, which particles have adsorbed on the surface at least one modifier selected from a compound having an anionic group, fine particles having an anionic group and negatively chargeable fine particles, and also a process for their production, wherein where the particles are composed of an epoxy type resin cured with an amine type curing agent, they can satisfactorily adsorb the aforesaid substance. As a result of the adsorption of the aforesaid substance to the particles, the static build-up properties, electrical conductivity, color shade, and other properties of the particles may be modified, and also it is possible to impart ultraviolet light absorbing ability and to prevent blocking between the particles. These particles may be employed as formulation ingredients for cosmetics, paints, electrostatic copier toners etc.

17 Claims, No Drawings ized to such an extent that the heating time is reduced to about one-half that required for the conventional process, and the heating temperature is reduced about 100° C. over the conventional process.
MODIFIED FINE PARTICLES AND A PROCESS FOR THEIR PRODUCTION This application is a continuation-in-part of application Ser. No. 651,362 (issued as U.S. Pat. No. 4,588,617 on May 13, 1986 to Oka).

BACKGROUND OF THE INVENTION

1. Field of the Invention

This invention relates to particles composed of organic spherical particles having an average particle size of 0.1–1000 μm and containing a cationic group, which particles have adsorbed on the surface one or more modifier selected from a compound having an anionic group, film particles having an anionic group and negatively chargeable fine particles such that the particles have surface properties and optical characteristics different from those of the original particles, and also to a process for their production.

2. Description of the Prior Art

The present inventor has previously presented in U.S. patent application Ser. No. 651,362 (issued as U.S. Pat. No. 4,588,617 on May 13, 1986, to Oka et al) a process for producing spherical particles of a cured epoxy resin having an average particle size of not larger than 50 μm and having a cationic group, which comprises adding an amine curing agent to a previously prepared emulsion or suspension of an uncured epoxy compound.

Japanese Patent Publication No. 53-42360 discloses a process for producing spherical particles of a cured epoxy resin having an average particle size of several hundred μm and having a cationic group which comprises dispersing a mixture of an epoxy compound having at least two epoxy groups and an amine curing agent in water.

Japanese Patent Application Kokai Publication No. 59-66406 discloses a process for producing acrylic polymer spherical particles having an average particle size of 8–80 μm and optionally containing a cationic group.

However, none of these inventions teach or suggest such particles and process for the production as those disclosed in the present invention, that is, modified spherical particles having adsorbed thereon a compound having an anionic group, fine particles having an anionic group or negatively chargeable fine particles, and a process for their production.

SUMMARY OF THE INVENTION

An object of this invention is to provide modified organic spherical particles composed of organic spherical particles having a cationic group and having an average particle size of 0.1–1000 μm, which particles have adsorbed on the surface one or more modifier selected from a compound having an anionic group, fine particles having an anionic group and negatively chargeable fine particles and a process for their production.

Another object of this invention is to provide organic spherical particles the surface properties and optical properties of which have been modified by adsorbing a compound having one or more sulfone groups, carboxyl groups or phenolic OH groups and a process for their production.

Still another object of this invention is to provide organic spherical particles which have been imparted with high heat resistance and solvent resistance by adsorbing an inorganic or organic polybasic acid and a process for their production.

A further object of this invention is to provide organic spherical particles the surface properties and optical properties of which have been modified by adsorbing on the surface oxide particles of an amphoteric compound and a process for their production.

A still further object of this invention is to provide organic spherical particles which have been modified to have electrical conductivity by adsorbing on the surface negatively chargeable metal particles and a process for their production.

A still further object of this invention is to provide organic spherical particles having negatively chargeable latex particles absorbed thereon and having thereby modified surface properties, and also to provide a process for the production of these particles.

A still further object of this invention is to provide a process for the production of organic spherical fine particles which comprises emulsifying or suspending a monomer or oligomer which has a cationic group when made into a polymeric form in a liquid to form particles having an average particle size of 0.1–1000 μm, thereafter curing the particles with a curing agent to form a particulate polymer and subjecting them to a wet process thereby adsorbing on the surface of said particles one or more modifier selected from a compound having an anionic group, fine particles having an anionic group and negatively chargeable fine particles.

A still further object of this invention is to provide particles which may be employed as formulation ingredients for cosmetics, points electrostatic copier toners, conductive adhesives etc., and a process for their production.

DETAILED DESCRIPTION OF THE INVENTION

The organic spherical particles having a cationic group and having an average particle size of 0.1–1000 μm which constitute the present invention may be generally produced from an epoxy compound cured with an amine curing agent or from an acrylic polymer containing an amino group.

The epoxy spherical particles having an average particle size of 0.1–1000 μm may be generally produced as follows:

One process comprises preparing mechanically ground particles of normally solid uncured epoxy resin or an epoxy compound which has been partially or fully cured with an amine curing agent, making these particles spherical for example by gravitationally dropping through a heated cylinder, and subsequently completing the curing by e.g. a method of contacting with an amine curing agent (this being referred to as the first process).

As an alternative process, there is a process which comprises emulsifying or suspending an uncured epoxy resin in an aqueous liquid and thereafter curing it (this being referred to as the second process).

As a further process, there is a process which comprises allowing an uncured epoxy resin and an amine curing agent in a liquid polyol to stand and precipitate to polymerize (this being referred to as the third process).

Although this invention is not particularly restricted concerning the above three processes, the second and third processes are particularly preferred in view of the uniformity, spherical shape and other properties of the particles. Inter alia, the second process, and in particular, the process which proceeds via an emulsion using a surface-active agent is a preferred process in view of the productivity.

The epoxy compound used in this invention is preferably that containing two or more epoxy groups. Examples thereof include both terminal glycidyl etherified products of a Bisphenol A type compound, polyethylene glycol diglycidyl ether, polyglycidyl ethers of phenol novolak type compounds, N,N,N',N'-tetraglycidyl-m-xylenediamine etc. which may be used either alone or in mixture. Further, it is possible to add a small amount of a compound having one epoxy group in the molecule, e.g. glycidylmethacrylate as needed. Further, a modified epoxy compound in which a part of the epoxy groups is combined with a compound having an amino group may be used in this invention.

In the first process, powdered particles are prepared first by mechanically grinding either a solid epoxy compound among the aforesaid epoxy compounds or a resinous material which is a solid at room temperature or in its vicinity which is obtained by partially or wholly curing with an amine curing agent such as piperazine or m-xylenediamine etc. Thereafter, these particles are made spherical, for example by a method which comprises charging them into a heated cylinder having an internal temperature of about 60°–400° C. from the top part and allowing them to gravitationally drop. The particles after being made spherical may be either immersed in an aqueous solution of an amine curing agent such as piperazine, ethylenediamine, m-xylenediamine or a solution thereof in an organic solvent such as dioxane, or directly mixed with a curing agent, and heated if needed to achieve the introduction of the amine curing agent into the particles and the curing thereof.

In these curing reactions, a curing agent other than the amine curing agent as a phthalic anhydride may safely be co-present.

In the second process, particles of an epoxy compound emulsified or suspended in an aqueous liquid are cured with an amine curing agent. Although the curing agent and the curing method are not particularly restricted, there are (1) a method which comprises emulsifying or suspending an epoxy compound to which a curing agent has been previously been added in an aqueous liquid and curing in situ, and (2) a method which comprises adding a water-soluble amine curing agent to an aqueous emulsion or suspension of an epoxy resin and curing.

For the former method, normally liquid ethylenediamine, diethylenetriamine, N-(2-aminoethyl)piperazine are particularly suitable as a curing agent. These curing agents are added to an epoxy compound in an amount of about 0.1–1.2 equivalent and made into aqueous suspensions.

The method which comprises adding a water-soluble amine curing agent to an aqueous emulsion or suspension of an epoxy compound (the latter method) may further be classified as follows:

(A) A method which comprises upon adding a water-soluble curing agent to an epoxy compound emulsion or suspension to cure into a spherical form, using a water-soluble curing agent containing piperazine or a piperazine derivative of the following general formula:

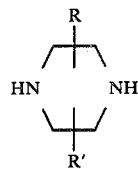

wherein R and R' represent each a hydrogen atom or a hydrocarbon residue of 1–4 carbon atoms, in an amount of 0.15 equivalent or more as stoichiometrically calculated based on the epoxy equivalent of the emulsion or suspension of the epoxy compound.

(B) A method which comprises upon adding a water-soluble curing agent to an emulsion or suspension of an epoxy compound to cure into a spherical form, using a water-soluble curing agent which contains hydrazine or a hydrazine derivative of the following general formula:

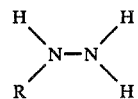

wherein R represents hydrogen, an alkyl group of up to 5 carbon atoms, a phenyl group or a 2-hydroxyethyl group, in an amount of 0.2 equivalent or more as stoichiometrically calculated based on the epoxy equivalent of the emulsion or suspension of the epoxy compound.

(C) A method which comprises adding a water-soluble curing agent to an emulsion or suspension of an epoxy compound to cure into a spherical form to produce spherical epoxy type particles having an average particle size of 0.5–50 μm,
  (I) the emulsion or suspension of the epoxy compound being prepared by adding a surface-active agent having an HLB of 12 or higher in an amount of 10% by weight or more based on the epoxy compound,
  (II) the water-soluble curing agent being an amine which, when mixed with an equivalent amount of the aforesaid epoxy resin at normal temperature and the resulting mixture is allowed to stand for 8 hours, has a Shore A hardness of 70 or higher, and this water-soluble curing agent being added in an amount of 0.5 equivalent or more based on the epoxy compound.

Any of the above-described methods may be employed to achieve the present invention, and there is no particular restriction, but the methods according to the aforesaid (A), (B) and (C) are particularly preferred in view of the uniformity in shape of the particles and the uniformity of the particle size distribution.

Examples of the amine curing agent used in the second process generally include but are not restricted to the following compounds: piperazine, hydrazine, polyethylenepolyamines such as ethylenediamine, diethylenetriamine, triethylenetetramine, alcoholamines such as monoethanolamine, N-(2-aminoethyl)piperazine etc.

In the second process, an aqueous emulsion suspension of an epoxy compound is prepared, and examples of the method therefor are described below:

(1) A method which comprises continuously ejecting an epoxy compound or its solution from a nozzle vibrating in air or in a liquid thereby cutting the epoxy compound or its solution into liquid droplets, and collecting them in a liquid.

(2) A method which comprises ejecting an epoxy compound or its solution in a pulse form from a nozzle in air or in a liquid, and collecting the resulting material in a liquid.

(3) A method which comprises emulsifying by using a combination of an epoxy compound containing a surface-active agent and water.

(4) A method which comprises emulsifying by using a combination of a powdered emulsifier, an epoxy compound and water.

(5) A method which comprises emulsifying by using a combination of water containing a protective colloidal substance and an epoxy compound.

Of the above-described methods, while the methods (3)–(5) are preferably used in the present invention in view of the productivity, combinations of the methods (1)–(5) may also be preferably used in the present invention.

The surface-active agent is not particularly restricted in the above-described methods (A) and (B) for obtaining epoxy type spherical particles, and any of those generally known as emulsifiers for uncured epoxy resins, such as polyoxyethylene phenol-substituted ethers may safely be used. As the surface-active agent for use in the above method (C), that having an HLB value of 12 or more is used in an amount of 10% by weight or more based on the epoxy compound. Where the HLB value does not satisfy this range, there is a tendency that curing into a spherical form is not attained even when the above-described specific amine curing agent is used.

In general, examples of the surface-active agent preferably used in the second process include ether type nonionic surface-active agents such as polyoxyethylene phenol-substituted ether types, polyoxyethylenepolyoxypropylene block polyether types etc., ester type nonionic surface-active agents such as higher fatty acid esters of polyethylene glycol, aliphatic acid esters of polyols etc., and the like.

Where a powdered emulsifier such as crystalline cellulose, barium sulfate is used, it is a method suitable for producing relatively large particles of an average particle size of 10–1000 μm.

It is also possible in the present invention to effect the emulsification by using a substance exhibiting a protective colloidal effect such as polyvinyl alcohol, hydroxymethyl cellulose, sodium alginate etc.

Where the epoxy compound is emulsified or suspended by using a surface-active agent, a powdered emulsifier or a protective colloid substance, it is general to adopt a method which comprises using an epoxy compound and water, either of which contains one of the above agents, and gradually adding water to the epoxy compound stirred at a high speed. The formed emulsion or suspension has a concentration of 10–80% by weight.

For adding an amine curing agent to an emulsion or a suspension of an epoxy compound, it is general to add the curing agent either directly or as an aqueous solution. Although the curing agent can be a mixed system with another amine curing agent or with a curing agent of a different type, it preferably satisfies the particular use conditions for the above-described particular curing agent.

In the second process, (1) where the epoxy compound to which the curing agent has been previously added is made into an aqueous emulsion or suspension, then after this aqueous emulsifying or suspending, or (2) where the epoxy compound is firstly made into an aqueous emulsion or suspension and the curing agent is added, then after the addition of the curing agent, a curing reaction is allowed to take place while the mixture is allowed to stand or under mild stirring conditions. To obtain a satisfactory cured state, warming the entire system may be necessary.

The third process comprises dissolving in a polyester polyol or polyalkylene polyether polyol an expoxy compound containing two or more epoxy groups and an amine curing agent and allowing the solution to stand to undergo precipitation polymerization.

In the first process and the second process, additives such as pigments may be incorporated in the epoxy compound as needed, and a diluent for the epoxy compound such as ketones may also be incorporated in order to reduce the viscosity.

The acrylic polymer particles having an average particle size of 0.1–1000 μm may be obtained by emulsion polymerization or suspension polymerization of a mixture of an acrylic monomer containing an amino group such as dimethylaminoethyl (meth)acrylate, diethylaminoethyl (meth)acrylate, dimethylaminopropyl (meth)acrylate, dimethylaminobutyl (meth)acrylate reaction products of, reaction products of glycidyl (meth)acrylate and aliphatic primary and secondary amines etc., and an acrylic monomer containing no amino group, such as styrene, methyl (meth)acrylate etc.

The organic spherical particles having a cationic group used in the present invention may be prepared by the above-described processes, and those used in the present invention are particles having an average particle size of 0.1–1000 μm, preferably 0.5–500 μm. If the average particle size is less than 0.1 μm, the collecting of the particles is difficult, whereas if it exceeds 1000 μm, they are unsuitable for use as formulation ingredients for cosmetics, paints and other products for reasons of external, sedimentation etc.

As the compound used for ionic adsorption modification of particles in the present invention, there may be used one having an organic anionic group such as a sulfone group, a sulfine group, a carboxyl group, a hydroxyl phenolic group etc., one having an inorganic anionic group, such as sulfuric acid, phosphoric acid etc. In the case of that having the organic anionic group, a compound having one or more of these in the molecule is used.

Examples of the compound having an anionic group used in the present invention are described below:

As those having a sulfone group: ultraviolet absorbers having a sulfone group such as 2-hydroxy-4-methoxybenzophenone-5-sulfonic acid, 2,4-dihydroxybenzophenone-5-sulfonic acid, 3-benzylidene-6-phthalidesulfonic acid etc., surface-active agents such as laurylsulfonic acid, dodecylbenzenesulfonic acid etc., aromatic sulfonic acids such as styrenesulfonic acid, p-toluenesulfonic acid etc., heparin, spiropyran type sulfonic acid compounds showing photochromism etc.;

As those having a carboxyl group: aliphatic carboxylic acids such as acetic acid, succinic acid, lauric acid etc., dibasic carboxylic acids such as maleic acid, itaconic acid, oxalic acid etc., polybasic carboxylic acids such as butenetricarboxylic acid etc., aromatic carboxylic acids such as benzoic acid, aminobenzoic acids, phthalic acids, trimellitic acids, pyromellitic acids, (meth)acrylic acid, poly(meth)acrylic acid and copolymers thereof, alginic acid, carboxymethyl cellulose, fluorescein etc.;

As those having a phenolic hydroxyl group: benzophenone type ultraviolet absorbers such as 2-hydroxy-4-methoxybenzophenone, 2,3,4-trihydroxybenzophenone, benzotriazole type ultraviolet absorbers such as 2-(2-hydroxy-5-methylphenyl)-2H-benzotriazole; ascorbic acid etc.;

As compounds having an inorganic anionic group: sulfuric acid, phosphoric acid, nitric acid, hydrochloric acid, boric acid etc.

Of the above-described compounds having an anionic group, where the polybasic acid is used, it is possible to enhance the heat resistance and solvent resistance of the particles. Examples thereof include mineral acid types such as sulfuric acid, phosphoric acid, chain-formed hydrocarbon type polycarboxylic acids such as oxalic acid, maleic acid, itaconic acid, citric acid, tributenecarboxylic acid, aromatic type polycarboxylic acids such as phthalic acid, trimellitic acid, pyromellitic acid, aliphatic or aromatic polysulfonic acid compounds, compounds having both of one or more carboxyl groups and one or more sulfone groups etc. Inter alia, those preferably used in the present invention are mineral acids and compounds having polycarboxyl groups or polysulfone groups directly attached to the benzene ring.

The compounds having an anionic group used in the present invention may be in the form of salts with cations such as sodium, potassium, ammonium etc. Further, a part of the acid group of polybasic acids may form an ester. Representative examples of the ester are esters of alcohols and phosphoric acid, etc.

While the method for the ionic adsorption treatment of the spherical particles having a cationic group with the compound having an anionic group as described above is not particularly restricted, examples thereof are given below.

As the particles, it is general to use those obtained by curing, then filtering, washing and redispersing in water, or those obtained by redispersing a dried powder in water, but those obtained by dispersing in an organic solvent such as ethyl alcohol, dioxane may also be used.

It is preferred that the particles before adsorption treatment be on the alkaline side in order to accomplish the present invention. That the particles are on the alkaline side may be confirmed by that the pH of the aqueous solution thereof is higher than 7. However, where the particles have been quaternized, such restriction on the pH is not always applied.

Where the particles are present as an aqueous dispersion, a compound having an anionic group or a salt thereof used for this treatment is added either directly or as an aqueous solution, and stirred. During adsorption treatment, the temperature is preferably elevated to 40° C. or higher for faster adsorption, but it is not narrowly critical. The compound having an anionic group or a salt thereof is preferably in solution during treatment, and adsorption to the particles may generally be attained by stirring. Where the compound having an anionic group is an organic compound, adsorption to the particles may sometimes be attained rapidly and completely when the compound is used in combination with an acid exhibiting stronger acidity than that exhibited by the anionic group of the compound used in the treatment, e.g. sulfuric acid, acetic acid etc.

By the ionic adsorption of the compound having an anionic group to the spherical particles having a cationic group, it has been possible to efficiently impart various functions and make novel fine particles.

It has now therefore been possible by the present invention to present particles that will efficiently absorb ultraviolet light, particles having adsorbed thereon easily decomposable L-ascorbic acid (vitamin C), particles having adsorbed thereon a thickening agent such as sodium polyacrylate at a high concentration, particles having adsorbed thereon a fluorescent compound such as fluorescein in a great amount, particles fully modified to have desired electrostatic properties.

Further, it is also possible to gradually release a compound having an anionic group from the particles on which such compound is adsorbed by treating the particles with an alkaline compound such as sodium hydroxide, alkaline salt such as sodium chloride, sodium dodecylbenzenesulfonate or an organic cationic compound such as alkyltrimethylammonium halides. The time for gradual release or the amount released may be precisely controlled. This is because the particles have a small particle size and formulation with other substances is easy.

As examples of such use, cosmetics, and pharmaceuticals may be contemplated. In particular, since the products of this invention are of a small particle size, insertion into the human body, e.g. to the digestive organs is easy and also since it is possible to make a uniform product without making the particle size so small, when used as cosmetics, they may be used safely without deposition on the skin.

As the fine particles having an anionic group and the negatively chargeable fine particles to be adsorbed on the organic spherical particles having an anionic group in the present invention, representative examples include solid fine particles of an amphoteric compound and latex particles, respectively.

Examples of the solid fine particles used in this invention include metal fine powders and colloidal particles of copper, silver, gold, platinum, palladium, nickel, chromium, optionally antimony-doped fine powder of tine oxide, indium oxide, electrically conductive titanium oxide, carbon black, inorganic fine powders and colloidal particles of oxides, sulfides and sulfates, hydroxides, for example, silicon dioxide, pulverulent silica, silica sol, titanium oxide, pulverulent titanium oxide, alumina, alumina sol, böhmite, zinc sulfide, triiron tetroxide, chromium oxide, cadmium sulfide, barium sulfate, fine powders of inorganic pigments, clay, talc, zeolites, organic pigments such as Phthalocyanine Blue, Red #202, fine powders of organic polymers, fine powders of organic compounds, and these solid fine particles may be used either singly or in mixture.

Examples of the latex type used in the present invention include acrylonitrile/butadiene type latexes, acrylate latexes, styrene/butadiene type latexes, vinyl chloride type latexes, vinyl acetate/ethylene type latexes, vinyl chloride/vinyl acetate/ethylene type latexes, acryl/vinyl acetate/ethylene type latexes, isoprene type latexes, vinylidene chloride type latexes, fluorine polymer type latexes, silicone emulsions, and these latexes may be used either singly or in mixture.

In the present invention, the average particle size D of the organic spherical particles and the average particle size d of the fine particles to be adsorbed preferably satisfy the following relationship:

$$5d \leq D$$

As the average particle size d of the fine particles to be adsorbed becomes greater relative to the average particle size D of the organic spherical particles, the fine particles on the organic spherical particles tend to fall off. For this purpose, the relationship is more preferably in the range: $20d \leq D$.

In order to make the organic spherical particles adsorb the above-described fine particles, the following methods are suitable.

(1) A slurry of the organic spherical particles and the fine particles are mixed and stirred. This method, often results in adsorption of only a small amount of the fine particles.

(2) The aforesaid mixture is heated and stirred at 50° C. or above, preferably at 80° C. or above. By this method, most of the fine particles can be adsorbed.

(3) A salting-out compound such as sulfuric acid, phosphoric acid, acetic acid, hydrochloric acid, sodium chloride, aluminum chloride, caustic soda is added to the aforesaid mixture and treated by stirring. Further, if needed, the temperature is elevated.

The latex has different covering properties depending on its glass transition temperature (Tg), and where Tg is in the vicinity of room temperature or below, the latex covers the surface of the organic spherical particles as a uniform coat, whereas if Tg is higher than the adsorption treatment temperature, the latex is present as small grains on the surface of the organic spherical particles. Therefore, by selecting the intermediate Tg, it is possible to freely control the covering properties from the coat to the grains. Further, of the latexes having a low Tg, there are those capable of forming a crosslinking bond by heat or by addition of a crosslinking agent, and by selecting one of such latexes, it is possible to make a uniform coat on the surface of the organic spherical particles, and thereafter form a crosslinking bond for example by heating, thereby enhancing the thermal or mechanical properties of the coat.

On adsorption treatment, the organic spherical particles are preferably previously prepared as a slurry in water or an inert organic solvent. In order to make the fine particles adsorb on and cover the surface of the organic spherical particles, a method of adsorption treatment in a slurry form is preferred. Although it is possible to make the fine particles in a dried form adsorb on the organic spherical particles in a dried form, there is in general a tendency for the covering properties to be not uniform, and also mass treatment is difficult. However, where adsorption treatment is conducted in a wet mode as in the present invention, not only mass treatment and simple operations are possible but also it is easy to uniformly cover the surface of each of the organic spherical particles.

The fine particles to be adsorbed are preferably preliminarily dispersed and made into a slurry in a manner similar to that for the organic spherical particles. For preliminary dispersing, a method using no dispersant such as a surface-active agent may be used. As an example of the method, a liquid nonionic surface-active agent is added to the fine particles to be adsorbed, the resulting mixture is kneaded sufficiently, then diluted with water if needed, and thus dispersed uniformly.

Stirring of a mixture of both components for adsorption covering of the fine particles on the organic spherical particles can be achieved even by such small strength as that imparted by a magnet rotating blade or, a propeller blade provided in a beaker, or it is also possible to use a high speed stirrer rotating at 10000 rpm or more such as a homogenizer, a ball mill, or a shaker etc. Further, adsorption covering may be achieved by a method in which a sealed container holding glass beads is subjected to shaking. Further, stirring treatment may also be achieved using a mortar. These devices can also be used to conduct preliminary dispersing or make a slurry of the organic spherical particles or the fine particles to be adsorbed.

The amount of the fine particles to be adsorbed which is used in single treatment in the present invention is in general 200% by weight or less, preferably 100% by weight or less, based on the organic spherical particles. If the amount of the fine particles to be adsorbed increases beyond this, there is observed a tendency that the organic spherical particles agglomerate with each other during adsorption treatment or the fine particles fall off, and therefore uniform covering is impossible.

By the present invention, it has now been made possible to provide surface modified particles obtained by freely covering fine particles or latex polymers on the surface of the organic spherical particles without being subject to restriction by electrostatic properties as with the dry mode.

The effects achieved by the present invention are as follows:

(1) Change in optical properties has been enabled.
(2) Impartation of magneticity has been enabled.
(3) Impartation of electrical conductivity has been enabled.
(4) Change in electrostatic properties has been enabled.
(5) Change in hydrophilic or hydrophobic property has been enabled.
(6) Blocking of the particles has been prevented.
(7) Flow properties of the particles have been improved.
(8) Control of the slow release speed as microscapsules has been enabled.

As described above, the present invention has made it possible to impart various desired properties to organic spherical particles and to provide particles suitable as formulation ingredients for electrostatic copier toners, as well as for cosmetics, pharmaceuticals, paints, adhesives, coating agents, inks, paper, films, plastic molded products etc.

EXAMPLE 1

Ten grams of a commercially available Bisphenol A diglycidyl ether type epoxy resin (Epikote 828, produced by Yuka-Shell Epoxy Co.) was placed in a 100 cc polyethylene cup, 0.8 g of a commercially available polyoxyethylene phenol substituted ether type surfaceactive agent having an HLB value of 13 (Noigen EA-137, produced by Dai-ichi Kogyo Seiyaku Co.) was added thereto, and kneaded using a stirring rod fitted with a Teflon plate-formed blade on the tip at 800 rpm for one minute. Thereafter, 6 cc of water put in a syringe was added in 1.5 cc portions at one-minute intervals with stirring at 800 rpm. A milky white emulsion was formed in the polyethylene cup.

To this secured epoxy emulsion was added a curing solution containing 0.6 equivalent of piperazine dissolved in 8 cc of water and homogenized by mild stirring.

This liquid mixture was allowed to stand at 25° C. for 5 days to cure into spherical particles having an average particle size of about 6 $\mu$m.

The cured particles were separated by suction filtration using filter paper, washed, and then redispersed in water to obtain a dispersion containing 10% by weight of the particles.

Two grams of an ultraviolet absorber 2-hydroxy-4-methoxybenzophenone-5-sulfonic acid was added thereto and the temperature was raised to 98° C. Eight grams of 4N sulfuric acid was added to treat for 2 hours.

After cooling, the treated mixture mixture was neutralized to pH 6.5 with a 0.5N NaOH aqueous solution, filtered and washed.

The concentration of the ultraviolet absorber contained in the filtrate was determined from a calibration curve at 320 nm. It was found that 99% or more thereof had been adsorbed on the spherical particles.

The spherical particles after drying were formed into a KBr disc and the weight-based absorptivity coefficient (K) at 320 nm was measured. It was found that K=1.8.

When the dried particles were extracted on a Soxhlet's extractor with ethyl alcohol for 5 hours, the percent 2-hydroxy-4-methoxybenzophenone-5-sulfonic acid extracted was 0.5%.

EXAMPLE 2

Ten grams of Epikote 828 used in Example 1 was placed in a 100 cc polyethylene cup, and 0.8 g of a surface-active agent Noigen EA-137 and 0.3 g of a crystalline cellulose (Avicell RC-591, produced by Asahi Chemical Industry Co.) as a powder emulsifier were added. Emulsification was effected in a manner similar to that in Example 1 to obtain an uncured epoxy emulsion.

A curing solution of 0.8 equivalent of piperazine dissolved in 10 cc of water was added to this emulsion, and homogenized by mild stirring. This was allowed to cure by leaving to stand at 25° C. for 10 days to obtain spherical particles having an average particle size of about 50 $\mu$m.

The cured particles were filtered off, washed, and then redispersed in water to obtain a ca. 10% by weight dispersion. To this was added 0.1 g of fluorescein sodium salt (about 1% by weight based on the particles), the mixture was stirred for 30 minutes, then 8 g of 4N sulfuric acid was added, the temperature was raised to 90° C. with stirring, and treatment was continued at the same temperature for an hour.

After cooling, the mixture was neutralized to pH 7.5 with a 0.5% caustic soda solution, filtered off, and washed. It was found that the particles were colored in orangish yellow while the filtrate only showed slight coloration attributable to the fluorescein.

The particles after drying were redispersed in water, and when sodium laurylsulfonate was added thereto, it was observed that the supernatant gradually began to be tinged with the characteristic fluorescent color attributable to the fluorescein, thereby it has been found that the fluorescein had been ionically adsorbed on the particles.

EXAMPLE 3

Forty grams of Epikote 828 was placed in a 300 cc polyethylene cup, 6 g of a surface-active agent Noigen EA-137 was added thereto, and, in a manner similar to that in Example 1, 24 cc of water was added thereto in four portions successively to prepare an uncured epoxy emulsion.

A solution of 1.5 equivalent of hydrazine hydrate dissolved in 30 g of water was added to the solution, which was then allowed to cure by leaving to stand at 25° C. for 10 days to obtain spherical particles of an average particle size of 1.5 $\mu$m.

The particles after curing were filtered and washed, then redispersed in 400 g of water, and divided into four portions. The divided dispersions were treated respectively by the following four different methods to obtain four different treated particles.

Method I (Comparative): After filtration and washing, the particles were dried without treating.

Method II: Five grams of 4N sulfuric acid was added, and the particles were treated at 85° C. for 2 hours, filtered without neutralization, washed and dried.

Method III: One gram of butenetricarboxylic acid was added, then, after raising the temperature to 85° C., 5 g of 4N sulfuric acid was added, and the particles were treated at the same temperature for 2 hours, then cooled, neutralized with 0.5N ammonia water to pH 7, filtered, washed and dried.

Method IV: The particles were treated in a manner similar to that in Method III except that the butenetricarboxylic acid was replaced by 1.4 g of sodium pyromellitate, and dried.

The static build-up properties of the respective type of particles were measured on a Toshiba blow-off static meter, and the results shown in Table 1 were obtained.

TABLE 1

| | Static Build-up Properties | |
|---|---|---|
| Treating Method | + Static Build-up properties | − Static Build-up Properties |
| Method I (Comparative) | o | x |
| Method II | o | o |
| Method III | o | o |
| Method IV | o | o | o: Static build-up properties present.
x: Static build-up properties hardly present.

EXAMPLE 4

Spherical particles having an average particle size of about 6 $\mu$m prepared in a manner similar to that in Example 1 were separated by suction filtration using filter paper, washed, and then the particles were redispersed in water to obtain a dispersion containing 10% by weight of the particles.

The amount of the piperazine remaining in the filtrate was determined by 0.1N hydrochloric acid titration using Methyl Orange as an indicator. It was found that 85% by weight of the piperazine used (percent piperazine reacted) had been reacted with the epoxy group and incorporated into the particles as a constituting component.

The above-described dispersion was treated with various polybasic acids in amounts corresponding to 2 equivalent based on the amount of the amino group in the particles. The glass transition temperatures (Tg) of the treated particles after drying at 50° C. were measured using a Model DSC-2C manufactured by Perkin Elmer Co. and the results are shown in Table 2.

TABLE 2

| Example | Polybasic Acid | Treating Conditions | Tg (°C.) |
|---|---|---|---|
| 4 - 1 | Sulfuric acid | 98° C. × 2 hrs | 153 |

TABLE 2-continued

| Example | Polybasic Acid | Treating Conditions | Tg (°C.) |
|---|---|---|---|
| 4 - 2 | Phosphoric acid | " | 148 |
| 4 - 3 | Trimellitic acid | " | 184 |
| 4 - 4 | Citric acid | " | 106 |
| Comparative Example | None (water) | " | 92 |

EXAMPLE 5

Spherical particles having an average particle size of about 6 μm prepared in a manner similar to that in Example 1 were separated by suction filtration using filter paper, washed, and then redispersed in water to obtain a dispersion containing 10% by weight of the particles.

Equal amounts (by weight) of rutile type titanium dioxide JR-600R (produced by Teikoku Kako Kabushiki Kaisha, average particle size 0.2 μm) and a nonionic surface-active agent Noigen EA-137 were previously kneaded intimatedly to prepare a slurry in which the titanium oxide had been uniformly dispersed, then this slurry was added to the above dispersion of the spherical particles in an amount of 50% by weight on a solid basis (i.e. 50 parts of the titanium dioxide per 100 parts of the spherical particles), and the temperature was raised to 95° C. while slowly stirring using a Teflon-coated magnetic rotating blade. When treatment was effected at this temperature for an hour, the supernatant turned transparent, and the titanium oxide was adsorbed on the spherical particles. After filtration and drying, the particles were observed by scanning electron microscopy. It was found that the titanium dioxide had been adsorbed on the surface of the spherical particles to give covered conditions.

EXAMPLE 6

To a 10% by weight dispersion of spherical particles having an average particle size of about 6 μm obtained similarly as in Example 1 was added a slurry of 10% by weight on a solid basis (based on the particles) of electrically conductive tin dioxide EXPT-1 (Mitsubishi Metal Mining Co., average particle size 0.1 μm or less). This slurry had been prepared by intimately kneading equal amounts of ECPT-1 and Noigen EA-137.

This mixture was placed in a 300 cc glass sample tube together with 2 mm glass beads, put on a shaker (Nippon Rikagaku Kikai Kabushiki Kaisha, MRK Shaker Model JMS-1) and treated at 300 cpm for 5 minutes. Thereafter, a small amount of phosphoric acid was added to bring the pH of the mixture to the acidic side, and again shaking was conducted for 30 minutes. The particles and the glass beads were separated using a 200-mesh metal screen, and when the filtrate was allowed to stand, the supernatant became transparent, and it was found that ECPT-1 had been adsorbed on the spherical particles. The covering properties were confirmed by scanning electron microscopy.

The spherical particles having adsorbed ECPT-1 and the spherical particles having none adsorbed (Comparative Example) were measured for electrical resistivity and frictional electrostatic voltage, the results are shown in Table 3.

TABLE 3

| Example | Resistivity (Ω cm) | Frictional Electrostatic Voltage (μC/g) |
|---|---|---|
| 6 | $3.1 \times 10^8$ | + 0.16 |
| Comparative Example | $5.3 \times 10^{12}$ | + 2.7 |

The electric resistivity was measured on pellets molded at 600 kg/cm².

EXAMPLE 7

Ten grams of a commercially available phenol-novolak type epoxy resin (Epikote 152, produced by Yuka-Shell Epoxy Co.) was placed in a 100 cc polyethylene cup, and 0.8 g of a surface-active agent Noigen EA-137 was added. Emulsification was effected similarly as in Example 1, and thereafter a solution of 0.8 equivalent of piperazine dissolved in 8 cc of water was added and mildly stirred to homogenize. The mixture was allowed to cure by leaving to stand at 25° C. for 10 days to obtain spherical particles having an average particle size of 7.3 μm. They were filtered, washed and redispersed to obtain a 10% slurry.

Magnetic iron oxide BL-120 (Titan Kogyo Kabushiki Kaisha, average particle size 0.3 μm) intimately kneaded with an equal amount of Noigen EA-137 was added to this slurry in an amount of 90% by weight on a solid basis (based on the particles), and phosphoric acid was added to pH 2 while stirring by a stirrer having a Teflon plate-formed blade on the tip. Thereafter, the temperature was raised to 60° C. the treatment was carried out for one hour. After cooling, the mixture was neutralized to pH 6.5 with a 1N caustic soda aqueous solution. The supernatant was transparent, and it was found that BL-120 had been adsorbed on the spherical particles.

The particles after filtration and drying showed magnetism, and when a magnet was applied, the whole mass performed integrally and separation of BL-120 and the spherical particles was not observed at all.

EXAMPLE 8

Ten grams of Epikote 828 was placed in a 100 cc polyethylene cup, and 0.6 g (as a pure component) of a commercially available polyoxyethylene alkyl phenyl ether type surface-active agent Emulsit 49 (Dai-ichi Kogyo Seiyaku HLB=20.5) was added thereto. Emulsification was effected similarly as in Example 1 to obtain an uncured epoxy emulsion.

A solution of one equivalent of N-(2-aminoethyl)piperazine dissolved in 8 cc of water was added to this emulsion, which was allowed to cure by leaving to stand at 25° C. for 6 days, thereby obtaining spherical particles having an average particle size of 6 μm.

To the slurry after curing was added silica sol, Snowtex N (average particle size 0.02 μm, Nissan Chemical) in an amount of 2% by weight on a solid basis, then with stirring, a 0.1N phosphoric acid aqueous solution was added to pH 6.5, thereby making the spherical particles adsorb the silica sol.

The particles after drying showed high flowability.

EXAMPLE 9

Spherical particles having an average particle size of about 6 μm prepared similarly as in Example 1 were separated by suction filtration using filter paper, washed, and redispersed in water to obtain a dispersion containing 10% by weight of the particles.

To this dispersion of the sperical particles was added a styrene-butadiene type latex, Nipole LX 410 (average particle size 0.2 μm, Nippon Geon) in an amount of 50% by weight on a solid basis based on the spherical particles and a small amount of phosphoric acid were added thereto and stirring was effected at 95° C. for 5 hours. The whole amount of the latex was adsorbed on the spherical particles, and observation of the particles after filtration and drying by scanning electron microscopy revealed that the latex covered in a coat form the entire surface of the spherical particles.

EXAMPLE 10

Spherical particles having an average particle size of about 4.5 μm prepared similarly as in Example 3 except that the amount of the surface-active agent Noigen EA-137 was changed to 4 g were filtered, washed, then redispersed in 400 g of water, and divided into four portions. The particles of each divided dispersion were treated by the method set forth in Table 4.

The treated particles obtained in Example 10-3 were filtered, then dried, and observed by scanning electron microscopy. It was found that the fine particles of vinylidene chloride covered the surface of the spherical particles.

for 5 hours, thereby the whole emulsion was adsorbed to the spherical particles.

The particles after drying were very slippery.

What is claimed is:

1. Surface-treated organic spherical particles prepared by subjecting organic spherical particles having a cationic group to surface treatment with a modifier selected from the group consisting of (i) water soluble compounds having an anionic group, (ii) water insoluble fine particles having an anionic group, and (iii) negatively chargeable nonionic fine particles, wherein said organic spherical particles have an average size of 01–1,000 microns and are composed of a member selected from the group consisting of (a) epoxy compounds cured with an amine curing agent and (b) acrylic polymers containing an amino group.

2. The surface-treatment organic spherical particles as defined in claim 1, wherein said organic spherical particles are composed of an epoxy type resin.

3. The surface-treated organic spherical particles as defined in claim 1, wherein the cationic group is a primary, secondary, tertiary or quanternary amino group.

4. The surface-treated organic spherical particles as defined in claim 1, wherein the compound having an anionic group is an ultraviolet absorber.

5. The surface-treated organic spherical particles as defined in claim 1, wherein the fine particles having an

TABLE 4

| | Latex | | | Treating Conditions | | Results of |
|---|---|---|---|---|---|---|
| Example | Type | Trade Name | Amount used (wt %) | Acid | Temp. × Time | Treatment* |
| 10-1 | Vinyl Acetate-Ethylene | Sumicaflex 510 (Sumitomo Chemical) 0.7 μm | 30 | Phosphoric Acid | 95° C. × 1 hr | o |
| 10-2 | Vinyl Chloride-Ethylene-Vinyl Acetate | Sumicaflex 810 (Sumitomo Chemical) 0.4 μm | 30 | Phosphoric Acid | 95° C. × 1 hr | o |
| 10-3 | Vinylidene Chloride | Kureharon DO-813 (Kureha Chemical) 0.5 μm | 80 | Phosphoric Acid | 95° C. × 1 hr | o |
| 10-4 | Vinyl Chloride | Nipole GE 351 (Nippon Geon) 0.5 μm | 80 | None | 95° C. × 1 hr | o |

*Results of Treatment: o: The whole amount adsorbed.

EXAMPLE 11

Ten grams of Epikote 828 was placed in a 100 cc polyethylene cup, 1.2 g (as a pure component) of a commercially available polyoxyethylene alkyl phenyl ether type surface-active agent, Emulsit 49 having an HLB of 20.5 was added thereto. Emulsification was effected in a manner similar to that in Example 1 to obtain an uncured epoxy emulsion.

A solution of one equivalent of N-(2-aminoethyl)piperazine dissolved in 8 g of water was added to this emulsion, and stirred slowly to homogenize. The mixture was allowed to cure by leaving to stand at 25° C. for 10 days to obtain spherical particles having an average particle size of 3.5 μm.

The cured particles were filtered, washed, and redispersed in water to obtain a 10% by weight dispersion. To this dispersion were added a silicone type emulsion, SH 8240 (average particle size 0.6 μm, Toray Silicone) in an amount of 30% by weight on a solid basis based on the spherical particles and also a curing agent therefor, SH 22K, and treatment by stirring was effected at 95° C.

anionic group are oxide particles of an amphoteric element.

6. The surface-treated organic spherical particles as defined in claim 1, wherein the fine particles having an anionic group are fine particles haing a carboxyl group or a sulfone group.

7. The surface-treated organic spherical particles as defined in claim 1, wherein the fine particles having an anionic group are fine particles containing a surfaceactive agent having a carboxyl group or a sulfone group.

8. The surface-treated organic spherical particles as defined in claim 1, wherein the average particle size D of the organic spherical particles having a cationic group and the average particle size d of the fine particles having an anionic group or the negatively chargeable fine particles are in the following relationship:

5d<D.

9. The surface-treated organic spherical particles as defined in claim 1, wherein the compound having an anionic group is an inorganic acid.

10. The surface-treated organic spherical particles as defined in claim 9, wherein the inorganic acid is a polybasic acid.

11. The surface-treated organic spherical particles as defined in claim 1, wherein the compound having an anionic group is an organic acidic compound.

12. The surface-treated organic spherical particles as defined in claim 11, wherein the organic acidic compound has at least one sulfone group, carboxyl group or phenolic OH group or is a mono- or di-ester of an inorganic polybasic acid.

13. The surface-treated organic spherical particles as defined in claim 11, wherein the organic acidic compound is a polybasic acid having an aromatic ring.

14. The surface-treated organic spherical particles as defined in claim 1, wherein the negatively chargeable fine particles are metal fine particles.

15. The surface-treated organic spherical particles as defined in claim 14, wherein the metal fine particles are at least one type of particles selected from noble metal particles and solder particles.

16. The surface-treated organic spherical particles as defined in claim 1, wherein the negatively chargeable fine particles are latex particles.

17. The surface-treated organic spherical particles as defined in claim 16, wherein the latex particles are at least one type of latex selected from butadiene type, acrylate type, styrene type, vinyl acetate type, ethylene type, vinyl chloride type, vinylidene chloride type, silicone type and fluorine polymer type latexes.

* * * * *